UNITED STATES PATENT OFFICE.

JOHN A. JUST, OF SYRACUSE, NEW YORK, ASSIGNOR TO THE ASPHALTINA COMPANY OF AMERICA, OF SAME PLACE.

PAVING OR ROOFING COMPOSITION AND METHOD OF MAKING SAME.

SPECIFICATION forming part of Letters Patent No. 540,791, dated June 11, 1895.

Application filed January 14, 1895. Serial No. 534,908. (No specimens.)

*To all whom it may concern:*

Be it known that I, JOHN A. JUST, a citizen of the United States, residing at Syracuse, in the county of Onondaga and State of New York, have invented a new and useful Improvement in Paving or Roofing Compositions and Methods of Making the Same, of which the following is a specification.

This invention relates to that class of compositions of matter which are used as a cementing composition for admixture with finely divided mineral matter in the construction of pavements, roof coverings, &c.

The object of my invention is to produce a composition which is composed of comparatively inexpensive ingredients and compounded in a simple and inexpensive manner and which is permanent in its character and possesses the qualities required in a serviceable paving or roofing composition.

The base or principal ingredient of my improved composition is the petroleum residuum or sediment which remains in the storing tanks after the crude petroleum has been drawn off and which is commercially known as "B. S."

In compounding my improved composition I prefer to proceed in the following manner: The petroleum sediment or "B. S." is first freed from the water which it contains, amounting usually to from three to five per cent., by heating it for a sufficient length of time to a temperature of from 260° to 320° Fahrenheit. This "B. S." is next freed from its more volatile ingredients by distilling the same off at a temperature of from 450° to 750° Fahrenheit or higher. This operation of distilling may be continued until from fifteen to fifty per cent. of the original weight has been driven off, according to the character of the final product. The oil which has been so driven off can be advantageously used as fuel. The "B. S." residue remaining in the still is then allowed to cool to a temperature of 260° to 320° Fahrenheit, when resinous matter, preferably common rosin, and sulphur are added to the residue and mixed therewith in the still, or in some other vessel into which the "B. S." residue is drawn for the purpose. The rosin is preferably crushed and the sulphur is ground or pulverized. The entire quantity of rosin which is required may be added at once but the sulphur is preferably added gradually to prevent violent action and boiling over and also to enable the operator to better regulate the quantity of sulphur required for producing the desired effect by taking samples of the mixture from time to time and testing the same. The sulphur has a tendency to drive out the lighter hydrocarbons and to render the composition harder and more stable as to its melting point. After the sulphur has been added, the temperature of the mixture is raised to 400° Fahrenheit, or thereabout, to drive off the gases or vapors and prevent them from condensing in the mixture and acting as a solvent.

The mixture of "B. S." residue, rosin and sulphur, when cooled to the ordinary temperature, is very stringy or rubber-like and can be drawn between the hands at certain temperatures like molasses candy while the "B. S." residue without sulphur may be boiled down to any extent without acquiring any binding properties. In order to make the mixture less stringy or rubber like and at the same time elevate the melting point of the composition, caustic or slaked lime is added to the same after the temperature thereof has been lowered to 260° Fahrenheit or thereabout. The proportion of sulphur and lime in the mixture is best regulated by testing the material from time to time. Very good results are produced by adding sulphur to the "B. S." residue and rosin until the mixture can be drawn out between the hands to about ten to twelve inches and by afterward adding lime until the mixture can be drawn out no longer than about two and one-half to three inches, or in other words, lime is preferably added until the tenacity of the mixture is reduced to about one-fourth of what it was before adding the lime. The addition of lime does not only shorten the composition but also raises its melting point and makes the composition much tougher and peculiarly malleable after admixture with the mineral matter.

Approximately stated, nine hundred and sixty parts by weight of "B. S." residue, seven hundred and sixty to nine hundred and sixty parts of rosin, two hundred and sixty to three hundred and sixty parts of sulphur and one hundred and sixteen to one hundred and twenty-five parts of lime will produce a good composition, suitable as a binding cement for admixture with about four to six times its weight of mineral matter. This cementing composition is liquid at a temperature of about 250° Fahrenheit and can be drawn from the still or other vessel in which it is prepared, into barrels or other receptacles in which it hardens by cooling and can be put upon the market in that condition.

When from seven hundred and sixty to nine hundred and sixty parts of rosin and from one hundred and sixteen to one hundred and twenty-five parts of caustic or hydrated lime are used, as above described, the lime combines with part of the rosin and forms calcium resinate, but as the rosin is in excess of the proportion which is required for forming the resinate, the latter containing about twenty-eight parts of rosin to eight parts of lime, a considerable portion of the rosin remains free and uncombined with lime. This free rosin acts as a solvent for the calcium resinate so that the latter is to a greater or less extent in solution in the free rosin. The excess of rosin insures the formation of calcium resinate and prevents the destruction of the rosin by the lime. The free rosin lowers the melting point of the final product and facilitates the mixture of the ingredients.

Calcium resinate may be employed instead of caustic or slaked lime. This resinate is made by melting together caustic lime and rosin preferably in about the proportion of twenty-eight parts, by weight, of rosin to eight parts of caustic lime, but this proportion may be changed according to the nature of the desired ultimate composition. From ten to twenty-five per cent. of calcium resinate is added to the composition preferably at a temperature of from 380° to 400° Fahrenheit and the effect is substantially similar to that produced by the addition of caustic or slaked lime as above described.

As an illustration of the use of this cementing composition, it may be stated that for the preparation of a paving composition the following materials may be mixed under heating in about the following proportions, viz., two thousand one hundred and ninety-six parts by weight of the cementing composition, seven thousand two hundred and five parts of sand of such fineness that it passes through a sieve having about forty meshes to the linear inch and four thousand three hundred and twenty-four parts of calcareous or aluminous earth or other finely divided mineral matter. The paving composition so produced is laid in substantially the same way in which asphalt compositions are laid. It is durable and serviceable and does not become hard or brittle in cold weather, nor soft in warm weather, is not liable to crack, and is considerably cheaper than an asphalt composition. The hardness of the mixture may be increased by adding a greater or less quantity of tar, either coal, wood or petroleum tar, to the "B. S." residue and rosin before sulphurizing the same. For instance, two hundred and forty parts, by weight, of tar may be added to nine hundred and sixty parts of "B. S." residue, nine hundred and sixty parts of rosin and two hundred and eighty parts of sulphur.

I claim as my invention—

1. The herein described method of preparing a composition of matter which consists in adding rosin and sulphur to the petroleum sediment known as "B. S." substantially in the proportion specified and at a comparatively low temperature and then raising the temperature to about 400° Fahrenheit, whereby the petroleum sediment and the rosin are conjointly sulphurized, substantially as set forth.

2. The herein described composition of matter consisting of petroleum residuum, sulphur and calcium resinate, substantially as set forth.

3. The herein described composition of matter consisting of petroleum residuum, sulphur, calcium resinate and free rosin, substantially as set forth.

4. The herein described method of producing a composition of matter which consists in adding rosin and sulphur to petroleum residuum in the proper proportion to sulphurize both substances, raising the temperature to effect a chemical action of the sulphur upon both substances, and then lowering the temperature and adding lime in the proper proportion to combine with the rosin and form calcium resinate, substantially as set forth.

Witness my hand this 10th day of January, 1895.

JOHN A. JUST.

Witnesses:
JULIE R. JENNEY,
EDWARD WILHELM.